United States Patent [19]

Hazenbroek et al.

[11] Patent Number: 5,154,664
[45] Date of Patent: Oct. 13, 1992

[54] KEEL BONE CUTTER WITH FAT REMOVER

[76] Inventors: Jacobus E. Hazenbroek, Burg de Zeeuwstraat 52, Numansdorp; Bas Verrijp, Burg. de Zeeuwstraat 103, 3281 AG Numansdorp, both of Netherlands

[21] Appl. No.: 801,683

[22] Filed: Dec. 2, 1991

Related U.S. Application Data

[63] Continuation-in-part of Ser. No. 612,553, Nov. 13, 1990, Pat. No. 5,069,652, which is a continuation-in-part of Ser. No. 605,542, Oct. 29, 1990, abandoned.

[51] Int. Cl.$^5$ .............................................. A22C 21/00
[52] U.S. Cl. ................................. 452/134; 452/117; 452/160
[58] Field of Search ............... 452/134, 165, 167, 117, 452/118, 119, 166, 107, 116, 160

[56] References Cited

U.S. PATENT DOCUMENTS

| | | | |
|---|---|---|---|
| 4,558,490 | 12/1985 | Hazenbroek et al. | 452/165 |
| 4,574,429 | 3/1986 | Hazenbroek | 452/165 |
| 4,669,148 | 6/1987 | Scheier | 452/165 |
| 4,776,063 | 10/1988 | Tieleman | 452/134 |
| 5,069,652 | 12/1991 | Hazenbroek | 452/165 |

*Primary Examiner*—Willis Little
*Attorney, Agent, or Firm*—Hopkins & Thomas

[57] ABSTRACT

The present invention comprises a method and apparatus for automatically separating the breast from the neck, shoulders, back and saddle of birds while the birds are moving along as overhead conveyor line (12). A mandrel (61) is inserted into the visceral cavity of each bird to rigidly support each bird, and causes the breast of each bird to protrude outwardly. An auger (73) is mounted adjacent the rear surface (62) of the mandrel (61) and engages the visceral cavity of each bird as the mandrel (61) is inserted into the visceral cavity of each bird. A tiltable holding plate (76) is pivoted upwardly as the mandrel (61) and auger (73) are fully inserted into each bird, and engages the neck of each bird in a clamping relationship with the mandrel (61) to thereby hold each bird in place during cutting function. The birds are carried into engagement with a first rotary disk cutter (94) whicih cuts into the birds between the breast and neck of each bird to separate the breast from the neck, shoulders and upper back of each bird. A second rotary disk cutter (99), positioned downstream from the first rotary disk cutter (94), engages the birds between the breast and saddle and lower back of each bird, completing the removal of the breast of the birds. At the same time, the screw thread (76) of the auger (73) engages and scrapes the fat and particulate matter from the walls of the visceral cavity of the bird for the removal of the fat simultaneously with the removal of the breasts of the birds.

13 Claims, 4 Drawing Sheets

KEEL BONE CUTTER WITH FAT REMOVER

CROSS REFERENCE

This is a continuation-in-part of U.S. patent application Ser. No. 612,553, U.S. Pat. No. 5,069,652 filed Nov. 13, 1990, which is a continuation-in-part of U.S. patent application Ser. No. 605,542, filed Oct. 29, 1990, now abandoned.

FIELD OF THE INVENTION

The present invention relates in general to a system for automatically cutting apart previously eviscerated birds, such as chickens or turkeys. More particularly, the present invention relates to a method and apparatus for simultaneously automatically removing the breast portions from the exterior of the skeletal structures of previously eviscerated birds and removing the fat from the visceral cavities of the birds as the birds are suspended by their legs and moved in series along an overhead conveyor system in a poultry processing plant.

BACKGROUND OF THE INVENTION

In the processing of chickens, turkeys, and other types of birds through a poultry processing plant for defeathering, evisceration, cut-up and packaging and for delivery to retail grocery stores, fast food restaurants, etc., it is highly desirable to perform as many of the processing steps as possible with automated machinery. It is important to minimize the amount of manual handling of the birds so as to minimize the expense of processing and to uniformly cut apart the birds.

The general trend in poultry processing in recent years has been to suspend birds by their legs from an overhead conveyor system and perform as many of the processing steps as possible as the birds are being moved in series on the conveyor system from one processing station to the next. For example, the birds can be defeathered, decapitated, opened and eviscerated while being progressively advanced along an overhead conveyor system. Additionally, it is desirable to cut apart the birds and to remove the fat from the visceral cavities of the birds while the birds move on an overhead conveyor system to avoid the manual handling of the birds while the cutting and removal functions are being performed. A cut up system of this type is disclosed in my prior U.S. Pat. 4,574,429. However, it is still common practice to first remove the birds from the overhead conveyor system prior to cutting them apart, with the removal of fat from the carcasses often performed manually.

One of the problems with the prior art poultry cut up machines of the type that cut the birds while the birds are suspended from an overhead conveying system is that it is difficult to accurately position and maintain the birds in alignment with the cutting elements of the cut up machine so that proper cuts are formed in the carcasses. When birds of different sizes enter the machine, the larger or smaller birds tend to approach the cutting elements at positions that are too low or too high for the cutting elements.

Some prior art processing systems have been developed that use mandrels to support the birds during the cutting steps. A cut up system of this type is disclosed in my prior U.S. Pat. No. 4,559,672. The birds are each positioned with their previously eviscerated visceral cavities mounted on a mandrel. This supports the carcass at a predetermined position without regard to the lengths of the legs of the birds, and the mandrels tend to expand the skeletal elements of the birds to shapes corresponding to the mandrel. However, most of the poultry cut up machines that use mandrels require the birds to be mounted by hand on the mandrels.

Additionally, the fat of the visceral cavities of the carcasses typically is removed by hand, by using a knife or scraper tool. The use of such knives or scraper tools is labor intensive and can damage the meat and bones of the poultry carcasses, possibly chipping the bones or tearing the meat of the carcasses. Automated fat removal systems such as described in U.S. Pat. No. 4,776,063 have been developed for the automated removal of fat from poultry carcasses. However, such machines are designed solely for removal of fat from the carcasses and must be positioned in the processing line prior to the carcass cut up equipment, thus requiring additional processing steps in the processing of the carcasses.

Therefore, it can be seen that it would be desirable to provide an improved, reliable and accurate method and apparatus for use in a poultry processing line for simultaneously removing the breast portions from the carcasses of the birds and removing the fat from the visceral cavities of the birds as the birds are moved in series along an overhead conveyor system.

SUMMARY OF THE INVENTION

Briefly described, the present invention comprises a method and apparatus for simultaneously removing the fat and the breast portions of previously eviscerated birds as the birds are moved in series suspended from an overhead conveyor line in a poultry processing system. The keel bone cutter with fat remover apparatus is mounted in a poultry processing line along the path of movement of the birds, so that the breast removal and fat removal functions can be performed simultaneously and in series with other poultry processing steps.

The keel bone cutter with fat remover apparatus includes a plurality of mandrels mounted upon a revolving support frame and a cam system which moves the mandrels downwardly into and upwardly out of the visceral cavities of the birds as the mandrels are revolved in response to the movement of the overhead conveyor system. As the mandrels are inserted into the visceral cavities of the birds, the mandrels tend to fill out the visceral cavities, causing the breasts and limbs of the birds to protrude outwardly from the mandrels.

An auger is rotatably mounted to each mandrel and forms the rear surface of its mandrel and functions as a fat removal means. Each auger is an approximately conically shaped spindle having a screw thread concentrically circumscribed thereabout. The augers are each driven by a square drive shaft extending through the support frame and driven by the drive means for the revolving support frame. As the mandrels enter the visceral cavities of the birds, filling out the visceral cavities, the backs of the birds are pulled against the rotary augers. The screw threads of the augers engage the backs of the birds as the augers rotate, scraping the fat upwardly from the visceral cavities of the birds in the same operation in which the breast is removed from each bird.

A tiltable holding plate revolves with each mandrel and is tilted upwardly into engagement with the birds in response to the mandrel reaching its lowermost position in the visceral cavity of the birds. The tiltable holding plate has a protrusion at one end which engages the neck opening of the bird as the tiltable holding plate swings upwardly into engagement with the bird. The holding plate protrusion engages at the neck opening of the bird in a clamping relationship with the mandrel so as to positively grip the neck and breast portion of the birds. This clamping action stabilizes the neck and shoulders of the bird and functions to help hold the bird in place during the cutting function. Also, the holding plate requires the carcass of the bird to be positioned at the desired elevation on the mandrel so that the bird is at the correct elevation for the subsequent cutting and fat removal steps, and the holding plate stops the downward movement of the bird as its mandrel approaches its lowermost position so that the mandrel becomes fully inserted in the visceral cavity of the bird and urges the visceral cavity outwardly to a fully expanded configuration.

A stationary cutting blade is positioned along the path of movement of the birds as the birds are revolved about the revolving support frame. As the birds are revolved, they are passed into engagement with the stationary cutting blade. The stationary cutting blade forms guide incisions in the birds between the saddle and breast of each of the birds.

A first rotary disk cutter is positioned adjacent the revolving support frame along the path of movement of the birds. The first rotary disk cutter is oriented so as to cut upwardly into each bird between the breast, neck and shoulders of each bird to thereby separate the breast from the neck, shoulders and upper back of each bird. A second rotary disk cutter is mounted downstream from the first rotary disk cutter, and is oriented to cut into each bird between the breast and saddle of each bird. The second rotary disk cutter engages each bird at the guide incision previously made in each bird by the stationary cutting blade. The second disk cutter separates the breast from the saddle and lower back of each bird to thus complete the removal of the breast from each bird.

After the breast has been cut away from each bird, the cam system moves each mandrel and its auger upwardly and out of the visceral cavity of the bird and the tiltable holding plate is tilted downwardly away from the mandrel. As the mandrels are moved out of the visceral cavities of the birds, the screw threads of the augers scrape and draw the fat away from the visceral cavities of the birds. A telescoping suction tube is mounted adjacent each mandrel and auger and communicates with the augers the removal of the fat from the birds. An air flow is drawn through each suction tube to draw the fat scraped from the visceral cavities of the birds by the augers into the suction tubes and away from the birds.

A removal bar is mounted to the revolving support frame immediately adjacent each mandrel. As the mandrels are raised, the legs and saddle of each bird engage the removal bar and the birds are urged off of the mandrels, clearing the mandrels for continued operation and releasing the birds for further movement with the conveyor system.

Therefore, it is an object of this invention to provide an improved method and apparatus for automatically separating the breasts from the saddles, backs, necks and shoulders of birds and simultaneously removing the fat from the birds while the birds are being transported in suspended series along a poultry processing line.

Another object of this invention is to provide an improved method and apparatus for removing the fat from the visceral cavities of birds suspended from an overhead conveyor of a poultry cut up system and reliably and accurately removing the breast from the saddle, back, neck and shoulders of the birds moving along the overhead conveyor system in a single simultaneous processing step.

Another object of this invention is to provide an improved method and apparatus for reducing the manual handling steps required in the process of subdividing and removing the fat from the parts of poultry in a poultry processing plant.

Other objects, features and advantages of the present invention will become apparent upon reading the following detailed description when taken in conjunction with the accompanying drawings.

DESCRIPTION OF THE PREFERRED EMBODIMENT

Figure 1:
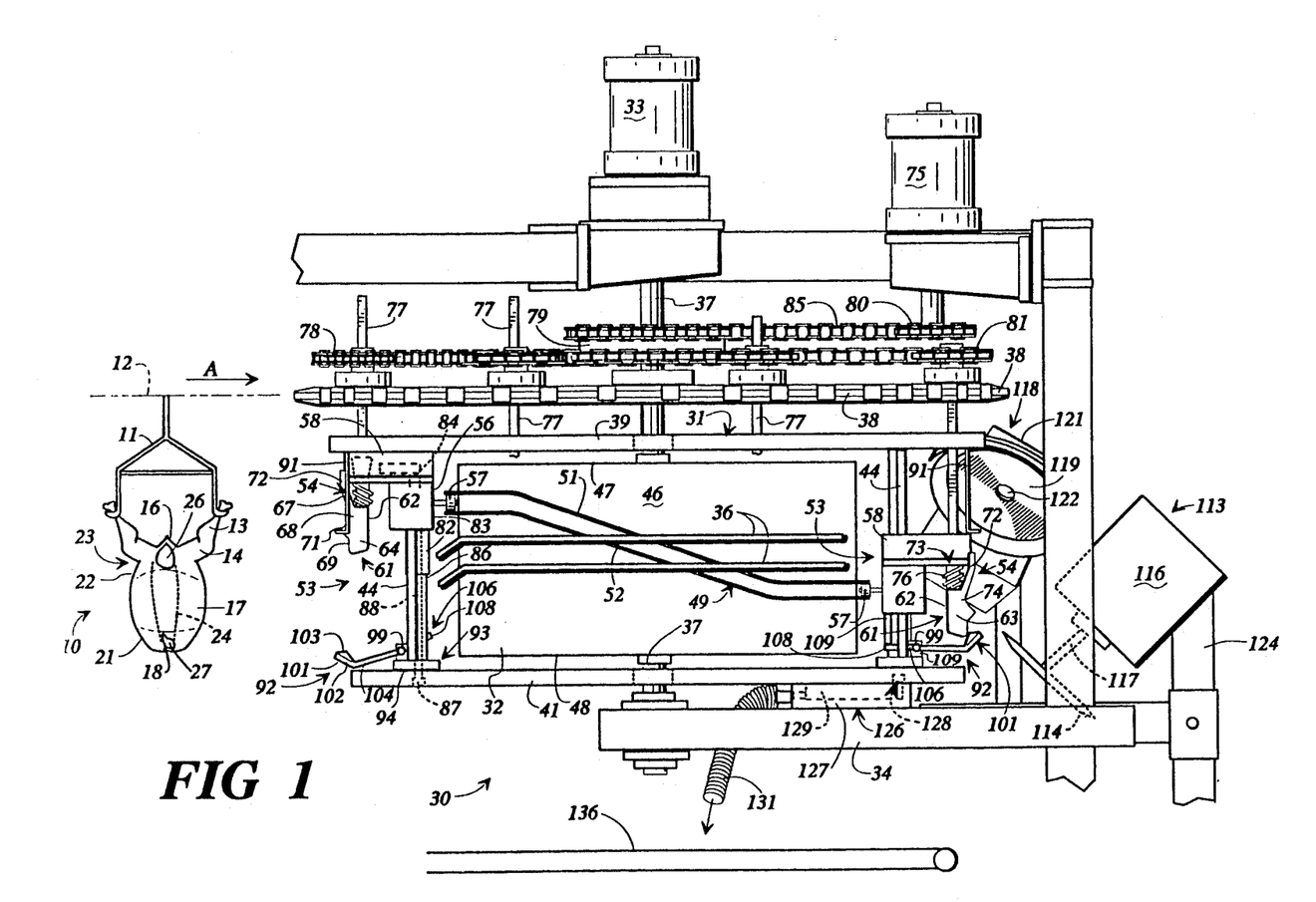
FIG. 1 is a side elevational view of the keel bone cutter with fat remover apparatus with only two removal modules shown mounted thereon for clarity.

Referring now in greater detail to the drawings in which like numerals indicate parts throughout the several views, FIG. 1 illustrates a bird 10 suspended from a shackle 11 of a conventional overhead conveyor system 12. The bird 10 includes legs 13, thighs 14, tail 16, breast 17, neck area 18, shoulders 19, an upper back 21, and a lower back 22. The legs 13, thighs 14, tail 16 and lower back 22 comprise the saddle portion 23 of the bird 10. The bird 10 includes a visceral cavity 24 (shown in dashed lines) which extends from a visceral opening 26 at the tail 16 of the bird through the bird to a neck opening 27 at the neck 18 of the bird.

As illustrated in FIG. 1 the bird 10 is carried by the overhead conveyor system 12 in the direction of Arrow A with the bird 10 hanging by its legs with its breast 17 facing downwardly. The wings (not shown) of the bird 10 typically have been removed prior to the engagement of the bird by the keel bone cutter with fat remover apparatus 30. However, the keel bone cutter with fat remover apparatus will function as described hereinafter with the wings still attached to the carcasses, if desired.

Figure 2:
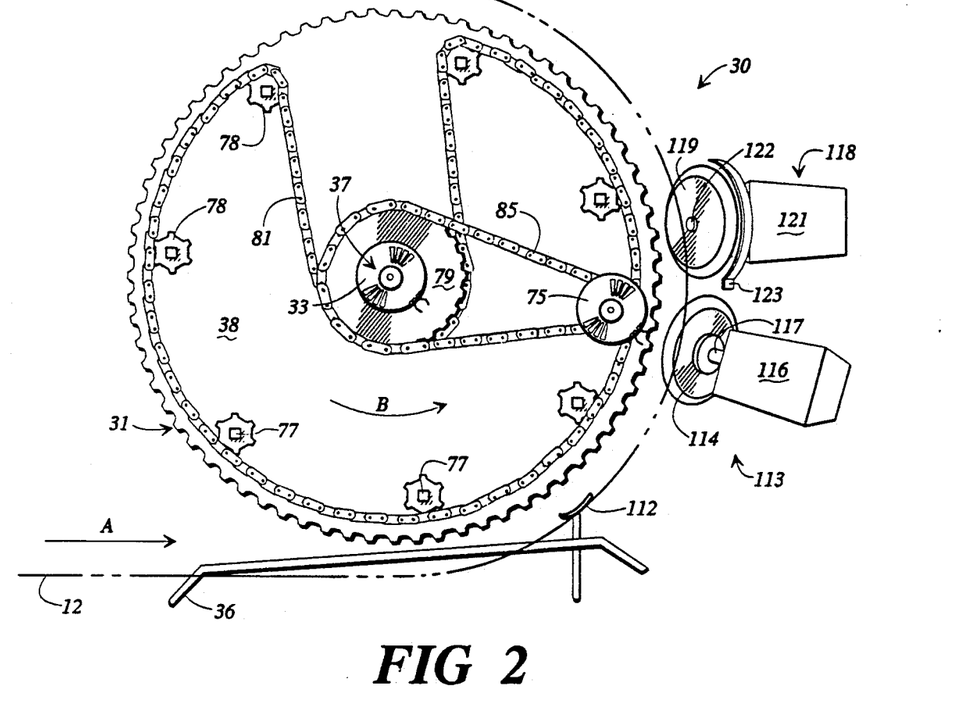
FIG. 2 is a plan view of the keel bone cutter with fat remover apparatus mounted along a poultry processing line illustrating the drive mechanism for the square shafts of the augers.

The keel bone cutter with fat remover apparatus 30 can be mounted on the floor of the processing plant in a stand alone arrangement; however, in the embodiment disclosed herein, the keel bone cutter with fat remover apparatus is mounted to a larger cut up apparatus, not shown, so that the keel bone cutter with fat remover apparatus functions in series with other processing devices on a common supporting framework. As shown in FIG. 2, the keel bone cutter and fat remover 30 includes a revolving carousel support frame 31 rotatably mounted about stationary cam drum 32. The support frame is revolved in the direction of arrow B by a drive motor 33 which drives a large sprocket or turning plate 38. As shown in FIGS. 1 and 2, the turning plate is a large circular plate mounted adjacent the overhead conveyor system 12. The turning plate 38 engages and drives the overhead conveyor system such that the support frame 31 revolves about cam drum 32 in timed relation with the movement of the birds along the overhead conveyor system. As shown in FIG. 1, the cam drum 32 is supported in a stationary position by a lower horizontal support arm 34 which also supports the carrousel frame 31 from a supporting framework (not shown). The periphery of the carrousel frame 31 and the overhead conveyor system are aligned and the path of the birds hanging from the overhead conveyor system 12 extends around the keel bone cutter with fat remover apparatus 30 and the motion of the overhead conveyor system rotates the carrousel frame 31 of the keel bone cutter with fat remover apparatus.

As illustrated in FIGS. 1 and 2, a pair of parallel guide rails 36 are positioned adjacent the breast removal apparatus 30. The guide rails 36 generally are aligned with the direction of movement of the birds 10 (FIG. 1), and are initially slanted inwardly toward the keel bone cutter with fat remover apparatus 30 so as to guide the birds toward the keel bone cutter with fat remover apparatus. The guide rails 36 extend horizontally along the direction of movement of the birds 10, and stabilize and guide the birds into position for engagement by the keel bone cutter with fat remover apparatus as the birds 10 slide along the length of the guide rails 36.

The revolving carrousel frame 31 has an upright rotatable support shaft 37 with the stationary cam drum 32 is mounted in a stationary position about the support shaft 37. The support shaft 37 extends through the turning plate 38 and is attached at its upper end to the drive motor 33. The turning plate 38 is rotatably mounted to the support shaft and is rotated with the rotation of the support frame 31 by the drive motor 33. Upper and lower rotary platforms 39 and 41 are mounted on support shaft 37. The upper and lower rotary platforms 39 and 41 are connected to one another by pairs of vertical guide bars 44 evenly spaced about the carrousel frame 31.

Figure 3:
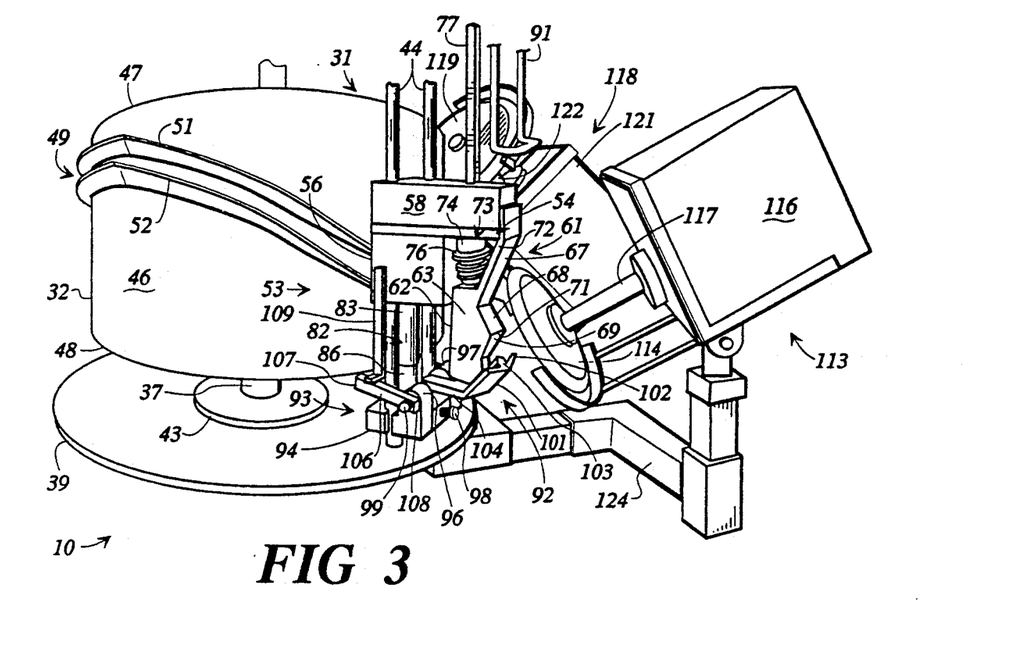
FIG. 3 is a perspective illustration of the keel bone cutter with fat remover apparatus illustrating the orientation of the rotary disk cutters in relation to the mandrel, with only one mandrel shown for clarity.

As shown in FIGS. 1 and 3, the cam drum 32 has a cylindrical side wall 46, an upper surface 47 and a lower surface 48. A cam system including a spiral cam track 49 having a pair of parallel cam surfaces 51 and 52 is formed about the cylindrical side wall 46. The cam track encircles the cam drum 32 in a substantially spiral path. A breast removal module 53 is attached to each of the pairs of vertical guide bars 44 and are raised and lowered by the spiral cam track 49 as the modules 53 are revolved by the rotary platforms 39 by the support shaft 37 around cam drum 32.

Each breast removal module 53 includes a carriage 56 (FIG. 3) which is slidably mounted on a vertical guide bar 44 to enable the carriage to slide vertically along the guide bars 44. A cam roller 57 is affixed to the rear of the carriage 54 and engages the cam surfaces 51 and 52 of the spiral cam track 49. The cam roller 57 rolls along the cam surfaces 51 and 52 of the spiral cam track 49 as the rotary platforms 39 and 41 revolve with support shaft 37, around cam drum 32 causing the carriage 56 of the breast removal module 53 to move vertically along the guide bars 44. A support block 58 is mounted to the upper surface of the carriage 56 extending outwardly from the carriage and thus moves vertically with the carriage 56. The support block is typically formed from a nylon or plastic material and has a recess 59 (shown in dashed lines in FIG. 4) formed in its lower surface. A mandrel 61 is attached at its upper surface to the support 58 and is supported by the support block 58, spaced outwardly and apart from the carriage 56.

As shown in FIG. 3, the mandrel 61 has an elongated body, preferably formed from a rigid nylon or plastic material, and has substantially flat rear and side surfaces 62, 63, and 64. The mandrel 61 (FIG. 4) has slanted front surfaces 67, 68 and 69 and tapers toward the bottom. A projection 71 is formed by the meeting of slanted front surfaces 68 and 69. The construction of the mandrel 61 enables it to be easily inserted into the visceral cavity 24 of a bird. The mandrel 61 fills out the bird as it engages the visceral cavity 24, causing the breast 17 of the bird to protrude outwardly and provides a rigid support for the bird during the removal of the breast 17 of the bird.

Figures 4, 6:
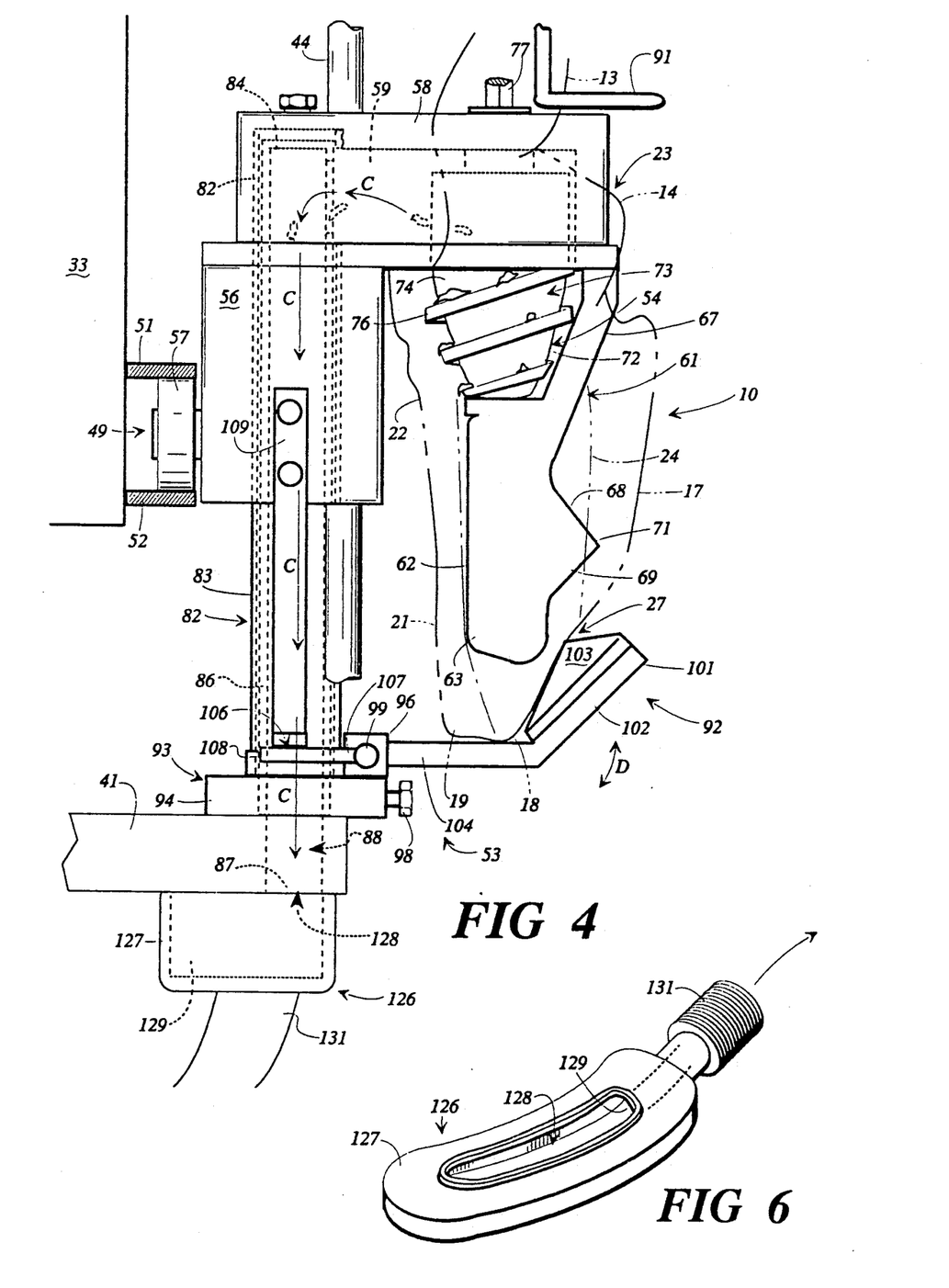
FIG. 4 is a side elevational view showing the insertion of the mandrel and auger into the visceral cavity of the bird and the tiltable holding plate engaging the neck of the bird in a clamping relationship with the mandrel.
FIG. 6 is a perspective illustration of the manifold of the vacuum system.

As shown in FIG. 4, the fat removal means 54 is rotatably mounted to the support block 58, positioned in a cut-away portion 72 of the mandrel 61, formed behind the front surface 67 of the mandrel. Thus, the fat removal means moves with the mandrel as the mandrel moves into and out of the visceral cavity 24 of the bird 10. The fat removal means 54 includes an auger 73 having a conically shaped spindle 74 with a screw thread 76 concentrically circumscribed thereabout. The screw thread engages the walls of the visceral cavity of the bird to scrape fat and debris from the visceral cavity for removal. The spindle 74 of the auger extends upwardly into the recess 59 formed in the support block 58 and is attached at its top surface to a square drive shaft 77.

The square drive shaft 77 extends upwardly through the support block 58 and through the upper rotary platform 39 (FIG. 1) and the turning wheel 38 (FIG. 2). The square drive shaft projects upwardly through a peripheral drive gear 78 rotatably mounted about the peripheral edge of the turning wheel, moving vertically through the peripheral drive gear 78 with the vertical movement of the removal modules 53 (FIG. 1) into and out of engagement with the bird 10. As shown in FIG. 2, a central drive gear 79 is rotatably mounted about support shaft 37. As illustrated in FIGS. 1 and 2 a drive motor 75 is mounted to one side of the central drive gear 78, above the peripheral edge of the turning plate 38. A sprocket 80 (FIG. 1) is connected to and driven by the drive motor 75. A first drive chain 85 (FIG. 2) extends about the central drive gear 79 and the sprocket 80 and is driven by the rotation of sprocket 80 by the drive motor. The drive motor 75 drives the sprocket 80 and thus drive chain 85, causing the rotation of the central drive gear 79 in timed relation with the rotation of the support frame 31 (FIG. 1) by drive motor. Each peripheral drive gear 78 (FIG. 2) is radially spaced from the central drive gear 79. A second drive chain 81 extends around the central gear and the peripheral gears mounted along the periphery of the turning plate 38. As the central drive gear is rotated by the first drive chain 80 and drive motor 75, the second drive chain 81 drives peripheral drive gear 78, causing the square drive shaft 77, and in turn the auger 73 (FIG. 4), to rotate.

As shown in FIGS. 1 and 4, a telescoping suction tube 82 is positioned between and extends parallel to the guide rods 44. The suction tube has an upper section 83 having an open upper end 84 (FIG. 4) extending through the carriage 56 and into the support block 58, communicating with the recess 59 formed in the support block 58 in which the auger 73 is received. The upper section of the suction tube is attached to the carriage and is thus movable vertically with the with the carriage at the removal module 53 is raised and lowered into engagement with a bird. The suction tube also includes a lower section 86 that projects through the lower rotary platform 41 and includes an open lower end 87, indicated in dashed lines. The lower section has a smaller diameter than the upper section such that the upper section of the suction tube telescopes over the lower section as the breast removal module 53 is lowered into engagement with the bird 10.

As illustrated in FIG. 4, a passageway 88 shown in phantom lines is formed through the suction tube 82 from the open upper end 84 to its open lower end 87. An air flow is drawn through the passageway in the direction of arrows C to draw fat and other material collected by the screw thread 76 of the auger 73 through the suction tube and away from the visceral cavity of the bird.

Figure 5:
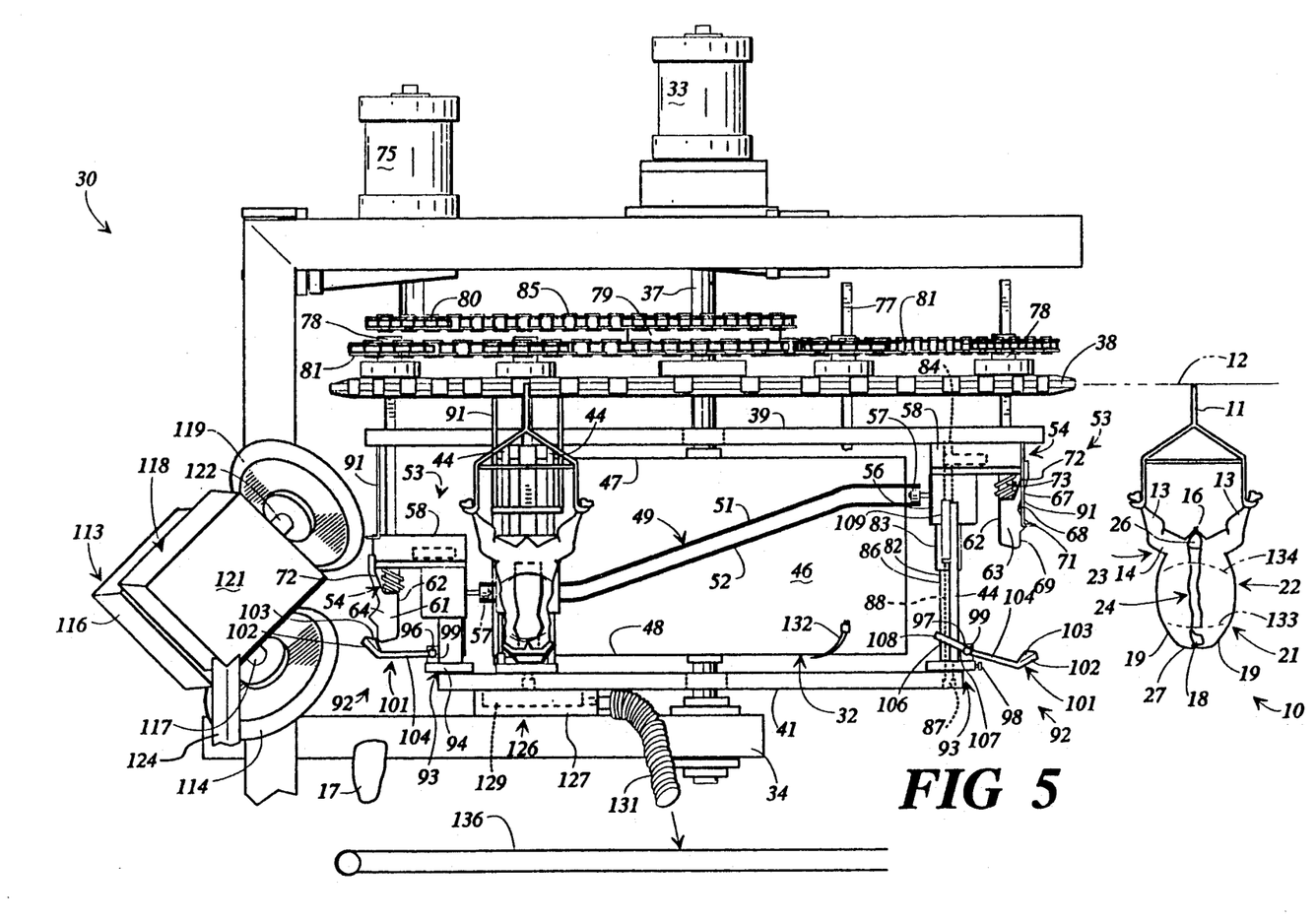
FIG. 5 is a side elevational view of the keel bone cutter with fat remover apparatus showing the position of the manifold for the vacuum removal of fat from the birds.

As shown in FIGS. 4 and 5, a removal bar 91 is affixed to the upper rotary platform 39 (FIG. 5) and extends adjacent front surface 69 and side surfaces 63 and 64 of the mandrel 61. The removal bar 91 is a substantially U-shaped rod of a length slightly longer than that of the mandrel 61 (FIG. 3), and extends downwardly, parallel to side surfaces 63 and 64 and across front surface 69 of the mandrel in a semicylindrical configuration. The removal bar 91 (FIG. 5) functions as a means for urging the bird off of the mandrel 61 and away from the removal module 53 once the breast 17 and fat of the bird has been removed.

A tiltable holding plate 92 is pivotably attached to a support block 93 (FIGS. 3, 4, and 5) which is slidably mounted on the guide bars 44 between the lower ends of the guide bars adjacent the lower rotary platform 41 (FIG. 1). As shown in FIG. 3, the support block 93 has a lower rectangular base plate 94, and a pair of tabs 96 and 97 which extend upwardly, perpendicular to the base plate. An adjustment screw 98 is provided on the inwardly facing side surface of the base plate 94 and functions to secure the support block 93, and hence the tiltable holding plate 92, in a fixed position along the length of the guide rods 44. Thus, the position of the support block and the tiltable holding plate 92 can be adjusted vertically and set at a fixed position to accommodate birds of various sizes. An axle 99 is rotatably attached to the tabs 96 and 97 extending through and spanning the region between the tabs. The tiltable holding plate 92 is attached to the axle 99, enabling the tiltable holding plate to swing in the direction Arrow D with the rotation of the axle.

The tiltable holding plate 92 includes an outwardly extending U-shaped front plate 101 which has a pair of upwardly curved side portions 102 and a substantially rectangular wishbone engagement protrusion 103 mounted on top of the front plate 101, between the side portions 102. The wishbone engagement protrusion 102 is constructed such that its shape corresponds to the skeletal protrusions of the wishbone of the bird and mates with the slanted front surface 69 of the mandrel 61. As shown in FIG. 4, the projection 71 tends to locate and engage the wishbone of the bird 10.

The tiltable holding plate 92 includes a pair of spaced apart arms 104 (FIG. 3) that extend inwardly from the front plate 83 of the tiltable holding plate 92, toward the cam drum 32 and are affixed to the axle 99 so as to mount the holding plate to the axle. As shown in FIG. 3, an open space is provided between the arms through which the neck 18 of the bird 10 is extended as the mandrel 61 engages the visceral cavity 24 of the bird. As illustrated in FIG. 4, the curved side portions 102 and the arms 104 extend beneath the shoulders of the bird and stop the downward movement of the bird as the mandrel approaches its lowermost position, thereby assuring that the bird is located at the proper elevation and that the mandrel is fully inserted in the visceral cavity of the bird and fully expands the visceral cavity to a shape that corresponds to the shape of the mandrel.

As shown in FIGS. 3, 4, and 5, a lever or tilt rod 106 is attached to the axle 99 along an outside edge of tab 97. The tilt rod 106 is a generally rectangular bar having a fixed end 107 attached to the axle and a free end 108. A rectangular contact bar 109 is attached to a side surface of the carriage 56 aligned with the free end 108 of the tilt rod. As the carriage is lowered and the mandrel enters the visceral cavity 24 of the bird 10, the contact bar 109 engages and urges the free end of the tilt rod downwardly, causing axle 99 to rotate and thus causing the tiltable holding plate 92 to swing upwardly in direction of arrows D (FIG. 4). As a result, the wishbone engagement protrusion 103 applies pressure at the neck opening 27 of the bird and engages the wishbone of the bird in a clamping relationship with the slanted front surface 69 of the mandrel 61 to stabilize the bird for cutting, with the curved portion 102 and the arms 104 of the tiltable holding plate 92 supporting the shoulders 19 of the bird.

As illustrated in FIGS. 1 and 2, a stationary cutting blade 112 is mounted between the parallel guide rails 36 positioned to one side of the cam drum 32. The stationary cutting blade 112 is mounted in a position to cut into the bird 10 (FIG. 1) between the saddle 23 and the breast 17 of the bird.

As shown in FIGS. 1, 2 and 3, a first rotary disk cutter 113 is positioned adjacent one side of the cam drum 32, downstream from the stationary cutting blade 112. The first rotary disk cutter 113 includes a cutting blade 114 which is oriented at an angle, substantially parallel to front surface 68 (FIG. 3) of the mandrel 61. The cutting blade 114 is connected to a drive motor 116 by a drive shaft 117. The drive motor 116 positioned adjacent the breast removal apparatus 30 and rotates the drive shaft 117, causing the rotation of the cutting blade 114.

A second rotary disk cutter 118 is positioned adjacent and downstream from the first rotary disk cutter 113. The second rotary disk cutter includes a cutting blade 119 which is oriented at an angle approximately parallel to front surface 67 of the mandrel 61. The cutting blade 119 is connected to a drive motor 121 by a drive shaft 122 (FIGS. 1 and 3). The drive motor 102 is positioned below the cutting blade 119, adjacent the breast removal apparatus 30, and rotates the drive shaft 122 which in turn rotates the cutting blade 119. A guide finger or tab 123 (FIG. 2) protrudes away from one side of the cutting blade 122, and helps guide the cutting blade 119 through the guide incision formed in the bird 10 by the stationary cutting blade 112.

As shown in FIGS. 1 and 5, the first and second rotary disk cutters 113 and 118 are mounted upon and supported by an adjustable cutting frame 124 which attaches to the stationary support arm 34 (FIG. 5), beneath the lower rotary platform 41. Thus, the orientation, height and distance of the cutting blades 114 and 119 from the birds can be easily adjusted by adjusting the cutting frame 106 to accommodate birds of different sizes.

As illustrated in FIG. 5, a manifold 126 is mounted adjacent the lower surface of the lower rotary platform 41. As shown in FIG. 6, each manifold is generally a curved block 127 formed from a nylon or plastic material and has a substantially oval shaped opening 128 formed therein aligned with the path of travel of the open lower ends 87 (FIG. 5) of the suction tubes 82 revolving with the support frame 31. A channel 129 is formed through the manifold for the passage of fat and debris being drawn through the suction tube 82. A vacuum hose 131 connected to a vacuum separator (not shown) is attached at one end of the manifold and communicates with the channel 129. An air flow is induced through the manifold and through the suction tube by the vacuum to pull the fat and debris removed from the bird through the suction tube and into the vacuum hose for removal.

As shown in FIG. 5, an upwardly spiraling guide bar 132 is mounted to the cam drum 32 downstream of the cutting blades and the manifold for the vacuum system. The guide bar extends from below the surface of the tilt rod 106 for the tiltable holding plate 92 to just above the lower surface 48 of the cam drum 32. The tilt rod engages the guide bar 132 and is urged upwardly as the tilt rod slides along the length of the guide bar, pivoting the tiltable holding plate 92 downwardly to its resting, unengaged position.

OPERATION

In operation of the keel bone cutter with fat remover apparatus 30 (FIG. 1), a bird 10 is carried by an overhead conveyor system 12 hanging downwardly by its legs 13. As the bird proceeds in the direction of Arrow A, it is carried into engagement with the pair of parallel guide rails 36. The guide rails 36 stabilize the bird and prevent it from swinging from side to side and tend to urge the bird toward the cam drum 32. The guide rails 36 orient the bird, as the bird moves along the guide rails so that the visceral opening 26 of the bird is in position to be engaged by the mandrel 61.

The mandrel 61 is initially positioned adjacent the upper edge 47 of the cam drum 32 in a non-engaging position. At the same time the bird 10 enters the keel bone cutter with fat remover apparatus, the carriage 56 (FIG. 3) on which the mandrel 61 is supported is moved with the rotation of the upper and lower rotary platforms 39 and 41 about the cam drum 32. The carriage 56 begins to move downwardly as the cam roller 57 of the carriage rolls along cam track 49. As the carriage 56 moves downwardly along the length of the vertical guide bars 44, it carries the mandrel 61 downwardly toward and into engagement with the visceral opening 26 (FIGS. 1 and 4) of the bird 10.

As the mandrel 61 enters the bird 10, the projection 71 (FIGS. 3 and 4) at the front of the mandrel engages the rib cage of the bird, filling the breast cavity of the bird. The filling of the breast cavity causes the breast 17 (FIG. 4) of the bird to swell and protrude outwardly. The mandrel 61 moves downwardly until it is completely inserted into the visceral cavity 24 of the bird and rigidly supports the bird during the cutting function.

At the same time the mandrel is inserted into the visceral cavity of the bird, the auger 73 is inserted into and engages the visceral cavity of the bird. As the mandrel 61 fills out the visceral cavity of the bird 10, the back of the bird is pulled into tight frictional contact with the screw thread 76 of the auger 73 as the breast of the bird is urged outwardly. The auger 73 is rotated by the revolution of its drive shaft as it enters the visceral cavity, causing its screw thread 76 to engage the walls of the visceral cavity to scrape fat and particulate matter from the visceral cavity. This collected fat and debris is carried upwardly by the screw thread into the recess 59 of the support block 58. As the fat and debris reaches the top of the screw thread, adjacent the lower surface of the support block 58, it is drawn into the recess and through the open upper end 84 (FIG. 4) of the suction tube 82 by the suction applied through the passageway 88 of the suction tube by the manifold 126. The fat is drawn through the passageway, down the length of the suction tube, out the open lower end 87 of the suction tube and through the manifold to the vacuum hose. Thus, the fat is drawn out and removed from the visceral cavity of the bird.

The contact bar 109 (FIGS. 3 and 4) mounted to the carriage 54 engages the free end 108 of the tilt rod 106 attached to the axle 99 of the tiltable holding plate 92 as the mandrel 61 and auger 73 (FIG. 4) are lowered and become completely inserted within the visceral cavity of the bird. The contact bar 109 urges the free end of the tilt rod downwardly toward a substantially horizontally orientation, as shown in FIGS. 3 and 4. In response to the downward movement of the free end of the tilt rod, the fixed end of the tilt rod rotates the axle 99, thereby causing the front plate 101 of the tiltable holding plate 92 to swing upwardly with the rotation of the axle 99 arrows D toward the neck opening 27 of the bird 10.

The wishbone engagement protrusion 103 of the front plate 101 is thrust into the neck opening 27 of the bird 10, penetrating the neck opening as the neck 18 of the bird 10 is extended through the open space between the arms 104 of the tiltable holding plate 92 in a clamping relationship the slanted front surface 69 of the mandrel 61, holding the wishbone in a fixed position between the wishbone engagement protrusion 103 and the front surface 69 of the mandrel 61. At the same time, the curved side portions 102 and the arms 104 of the front plate 101 are tilted into contact with the shoulders 19 of the bird as the wishbone engagement protrusion engages the neck opening of the bird. The curved side portions urge the shoulders 19 of the bird 10 upwardly and against the mandrel 61. The clamping of the wishbone of the bird 10 between the wishbone engagement protrusion 103 and the slanted front surface 69 of the mandrel 61 and the engagement and support of the shoulders 19 of the bird 10 by the curved side portions 102 of the tiltable holding plate 92 serve to positively grip and stabilize the neck 18 of the bird during the cutting function.

After the bird 10 has been engaged and secured by the mandrel 61 and the tiltable holding plate 92, the bird is carried into engagement with the stationary cutting blade 112 (FIG. 1) at the end of the guide rails 36. The stationary cutting blade cuts into the bird between the saddle 23 and the breast 17 of the bird. This forms a guide incision for the later cutting of the bird by the second rotary disk cutter 118.

The bird 10 is carried about the curve in the overhead conveyor system 12 by the rotation of the upper and lower rotary platforms 39 and 41 about the cam drum 32 in the direction of Arrow B (FIG. 2). As the bird rotates about the cam drum 32 (FIGS. 1 and 3), and at substantially the same time that the fat is being removed form the visceral cavity of the bird, it is engaged by the cutting blade 114 of the first rotary disk cutter 113. The cutting blade 114 cuts upwardly into the bird 10 (FIG. 1), between the breast 17 and the neck 18 and shoulders 19 of the bird. As shown by FIGS. 1 and 5, the cutting blade cuts into the bird along cutting lines indicated at 133. The breast 17 is thus separated from the neck 18, shoulders 19 and upper back 21 of the bird 10 by the first rotary disk cutter (FIG. 1).

As the bird 10 proceeds further along the overhead conveyor line 12, it is engaged by the second rotary disk cutter 118. The cutting blade 119 of the second rotary disk cutter cuts downwardly between the saddle 23 and the breast 17 of the bird 10, following through the guide incision made by the stationary cutting blade 112. The cutting blade 119 cuts along cutting lines 134, as shown in FIGS. 1 and 5, to separate the breast 17 from the saddle 23 and lower back 22 of the bird 10. As shown in FIG. 5, the breast 17 is cut free from the remaining portions of the bird and allowed to fall away onto a removal conveyor 136 positioned beneath the breast removal apparatus. Thus, the removal of fat from the visceral cavity of the bird and the removal of the breast form the bird is accomplished simultaneously in a single processing step.

Once the breast 17 has been removed from the bird 10, the carriage 56 is guided upwardly by the further movement of the cam roller 57 (FIG. 3) along cam track 49. The carriage 56 raises the mandrel 61 and auger 73 upwardly which tends to pull the bird 10 (FIG. 1) upwardly. The removal bar 91 (FIG. 5) positioned adjacent the mandrel 61 engages the legs and saddle of the bird as the mandrel is raised toward a resting, nonengagement position. As a result, the mandrel 61 and the auger 73 are disengaged from the bird which is carried away from the breast removal apparatus 30 for further processing while the mandrel rotates about the cam drum 32 toward engagement with additional birds.

At the same time the bird 10 is being urged off of the mandrel 61 and the auger 73, the free end 108 of the tilt rod 106 (FIG. 4) of the tiltable holding plate 92 engages and beings to slide upwardly along guide bar 132 (FIG. 5). As the tilt rod moves upwardly, the tiltable holding plate pivots about the axle 99 as shown by arrows D. The front portion 101 of the tiltable holding plate is correspondingly tilted downwardly toward a horizontally aligned resting position. Thus, if the tiltable holding plate ha been stuck with its front plate 101 in an upwardly tilted engagement position, due to skin, meat or other pieces of the bird being stuck between the axle 99 and the arms 104 or support block 93, the front plate is automatically returned to a resting position, ready for engagement with the neck opening of a bird.

It will be understood that the foregoing relates only to a preferred embodiment of the present invention, and numerous changes and modifications may be made thereto without departing from the spirit and scope of the invention as set forth in the following claims.

We claim:

1. A method of processing previously eviscerated birds, comprising:
    moving a plurality of birds in series suspended by their legs form an overhead conveyor system along a processing path;
    as each bird moves along the processing path, moving a mandrel downwardly into the visceral cavity of each bird and moving a holding means upwardly into engagement with the neck portion and shoulders of each bird to thereby clamp each bird between the mandrel and the holding means to stabilize each bird;
    simultaneously with the movement of the mandrel into the visceral cavity of each bird, moving an auger downwardly into the visceral cavity of each bird adjacent the mandrel to engage and scrape fat from the visceral cavity of each bird;
    while each bird is stabilized, cutting each bird and removing the fat from the visceral cavity of each bird at substantially the same time; and
    removing the mandrel and the auger from each bird and moving the holding means away from each bird.

2. The method of claim 1 and wherein the step of engaging and scraping fat from the visceral cavities of the birds comprises engaging the walls of the visceral cavities of the birds with screw thread means extending about the auger and rotating the auger, with the screw thread means pulling the fat from the walls of the visceral cavities of the birds, and moving the fat out of the visceral cavities and away from the birds.

3. The method of claim 1 an further including the step of inducing a flow of air adjacent the auger as the fat is removed form the visceral cavities of the birds with a velocity sufficient to draw off and remove the fat from about the auger, and moving the fat away from the birds.

4. The method of claim 2 and further including the step of rotating each auger as the augers are moved into and out of the visceral cavities of the birds to cause the screw thread means of each auger to engage and scrape the fat from the visceral cavities of the birds.

5. For use with a poultry conveyor which transports a series of birds suspended by their legs along a processing path, apparatus for simultaneously removing the fat from the visceral cavity of each bird and removing the breast from each bird, as the birds are moved in series along the processing path, comprising:
    a support frame;
    a plurality of mandrels mounted on said support frame for revolving along the processing path for engaging and supporting the birds during removal of the breast of each bird;
    cam means extending about said support frame for moving said mandrels into and out of the visceral cavity of each bird as said mandrels are revolved along the processing path;
    a first rotary disk cutter positioned along said processing path adjacent said support frame for engaging the birds between the breasts and the necks and shoulders to thereby separate the breasts from the necks, shoulders, and upper backs of the birds;
    a second rotary disk cutter positioned along said processing path downstream from said first rotary disk cutter and aligned with the movement of the birds along said processing path, for engaging the birds between the breasts and saddles to separate the breasts from the saddles and lower backs of the birds, and fat removal means juxtaposed each of said mandrels for moving with said mandrels and engaging and removing fat from the visceral cavity of the birds at substantially the same time as the birds are engaged by said cutters.

6. The apparatus of claim 5 wherein said fat removal means comprises an auger mounted to said support frame adjacent each of said mandrels and movable with said mandrel, each of said augers having a screw thread concentrically circumscribed thereabout adapted to engage and scrape the fat from the visceral cavity of a bird, and a drive shaft connected to each of said augers and auger drive means for rotating said augers as said augers engage the visceral cavities of the birds.

7. The apparatus of claim 5 and further including a suction means positioned adjacent said fat removal means for drawing the fat away from said fat removal means, said suction means comprising a telescoping suction tube revolving about said support frame and having an upper section attached to a support block for each of said mandrels and a lower section with which said upper section telescopes, said suction tube defining a passageway from the passage of fat removed by said fat removal means, and a manifold communicating with said lower sections of said suction tubes through which a vacuum is applied to induce a flow of air through said suction tubes with a velocity sufficient to draw fat collected by said fat removal means into and through said suction tubes.

8. The apparatus of claim 6 and further including a means for rotating said augers connected to a drive means for revolving said support frame, said means for rotating said augers comprising a central drive gear and a drive means for rotating said central drive gear, peripheral drive gears through which said rive shafts for said augers extend, and a drive chain surrounding said central drive gear and said peripheral drive gears such that as said central drive gear rotates, said peripheral drive gears are rotated to thereby drive said drive shafts of said augers.

9. The apparatus of claim 5 and further including a removal bar mounted to said support frame adjacent said mandrel for urging the bird off of said mandrel.

10. Apparatus for removing the fat from the visceral cavities of previously eviscerated birds simultaneously with the removal of other parts from the carcass of the birds as the birds move in series suspended by their legs along a processing path, comprising:

a support frame;

a plurality of carcass support modules mounted about said support frame having fat removal means mounted thereto for engaging and supporting the birds during cutting of the birds while simultaneously removing the fat from the visceral cavities of the birds;

drive means for revolving each module in series about said support frame and along the processing path;

a cam track extending around said support frame for guiding said carcass support modules into and out of engagement with the birds as said carcass support modules are removed about said support frame;

cutter means positioned adjacent said support frame along said processing path and oriented so as to cut into the birds to separate parts of the birds from the carcasses of the birds as the fat is removed from the visceral cavities of the birds by said fat removal means; and means for urging the birds away from said carcass support modules.

11. The apparatus of claim 10 and wherein said carcass support modules each comprise a pair of vertically aligned guide bars affixed to said support frame, a carriage slidably mounted upon said guide bars and movable vertically along said guide bars, a support block attached to and movable with said carriage and having a recess formed in a downwardly facing side surface, a cam roller attached to said carriage and in engagement with said cam track for guiding said carriage along said cam track, and a mandrel supported by said support block for engaging the visceral cavity of the bird to cause the breast of eh bird to expand outwardly.

12. The apparatus of claim 11 and wherein said fat removal means comprises an auger mounted adjacent each of said mandrels and movable with said mandrels, said augers each including a screw thread adapted to engage and scrape the fat from the visceral cavity of the bird and a drive shaft connected to said auger for rotating said auger as said auger engages the visceral cavity of the bird.

13. The apparatus of claim 12 and further including a means for rotating said augers connected to a drive means for revolving said support frame, said means for rotating said augers comprising a central drive gear connected to a drive means which rotates said peripheral drive gears through which said drive shafts of said augers extend and a drive chain surrounding said central drive gear and said peripheral drive gears such that as said central drive gear rotates, said peripheral drive gears are rotated to thereby drive said drive shafts of said augers.

* * * * *